US010554663B2

(12) United States Patent
Ganda

(10) Patent No.: US 10,554,663 B2
(45) Date of Patent: Feb. 4, 2020

(54) SELF-DESTRUCTING SMART DATA CONTAINER

(71) Applicant: CA, Inc., New York, NY (US)

(72) Inventor: Rohit Ganda, Telangana (IN)

(73) Assignee: CA, Inc., New York, NY (US)

( * ) Notice: Subject to any disclaimer, the term of this patent is extended or adjusted under 35 U.S.C. 154(b) by 189 days.

(21) Appl. No.: 15/467,011

(22) Filed: Mar. 23, 2017

(65) Prior Publication Data

US 2018/0278613 A1 Sep. 27, 2018

(51) Int. Cl.
*H04L 29/06* (2006.01)
*G06F 21/60* (2013.01)

(52) U.S. Cl.
CPC .......... *H04L 63/10* (2013.01); *G06F 21/602* (2013.01); *H04L 63/0876* (2013.01); *G06F 2221/2143* (2013.01)

(58) Field of Classification Search
CPC ... H04L 63/10; H04L 63/0876; G06F 21/602; G06F 2221/2143

USPC .......................................................... 726/4
See application file for complete search history.

(56) References Cited

U.S. PATENT DOCUMENTS

| 9,141,876 | B1* | 9/2015 | Jones | G06K 9/60 |
| 2006/0064756 | A1 | 3/2006 | Ebert | |
| 2016/0283699 | A1* | 9/2016 | Levin | G06F 21/44 |

* cited by examiner

*Primary Examiner* — Evans Desrosiers
(74) *Attorney, Agent, or Firm* — Baker Botts L.L.P.

(57) ABSTRACT

According to an embodiment of the present disclosure, a method is disclosed comprising receiving a request to access protected data stored in a smart data container. The method further comprises comparing a first device identifier associated with a first device from which the request to access the protected data stored in the smart data container was received to a second device identifier which uniquely identifies a second device that created the smart data container. The method further comprises allowing access to the protected data stored in the smart data container by the first device based on whether the first device identifier matches the second device identifier.

16 Claims, 5 Drawing Sheets

SELF-DESTRUCTING SMART DATA CONTAINER

BACKGROUND

The present disclosure relates to interfaces and, in particular, to a method, apparatus, and executable instructions for creating and accessing a self-destructing smart data container for protected data.

SUMMARY

According to an embodiment of the present disclosure, a method is disclosed comprising receiving a request to access protected data stored in a smart data container. The method further comprises comparing a first device identifier associated with a first device from which the request to access the protected data stored in the smart data container was received to a second device identifier which uniquely identifies a second device that created the smart data container. The method further comprises allowing access to the protected data stored in the smart data container by the first device based on whether the first device identifier matches the second device identifier.

According to another embodiment of the present disclosure, a computer comprises a processor and a non-transitory, computer-readable storage medium storing instructions. The instructions are executable by the processor to cause the processor to receive a first request to access protected data stored in a smart data container. The instructions are further executable by the processor to cause the processor to compare a first device identifier associated with a first device from which the first request to access the data stored in the smart data container was received to a second device identifier which uniquely identifies a second device that created the smart data container. The instructions are further executable by the processor to cause the processor to determine that the first identifier associated with the first device from which the first request was received matches the second identifier which uniquely identifies a second device that created the smart data container. The instructions are further executable by the processor to allow access to the protected data stored in the smart data container by the first device in response to determining that the first device identifier matches the second device identifier.

According to another embodiment of the present disclosure, a non-transitory, computer-readable storage medium is provided. The non-transitory, computer-readable storage medium has instructions stored thereon that are executable by a computing system to receive a request to access protected data stored in a smart data container. The instructions are further executable by the computing system to compare a first device identifier associated with a first device from which the request to access the protected data stored in the smart data container was received to a second device identifier which uniquely identifies a second device that created the smart data container. The instructions are further executable by the computing system to allow access to the protected data stored in the smart data container by the first device based on whether the first device identifier matches the second device identifier.

Other objects, features, and advantages will be apparent to persons of ordinary skill in the art in view of the following detailed description and the accompanying drawings.

BRIEF DESCRIPTION OF THE DRAWINGS

For a more complete understanding of the present disclosure, needs satisfied thereby, and the objects, features, and advantages thereof, reference now is made to the following description taken in connection with the accompanying drawings. Embodiments of the present disclosure, and their features and advantages, may be understood by referring to FIGS. 1-5, like numerals being used for corresponding parts in the various drawings.

DETAILED DESCRIPTION

Figure 1:
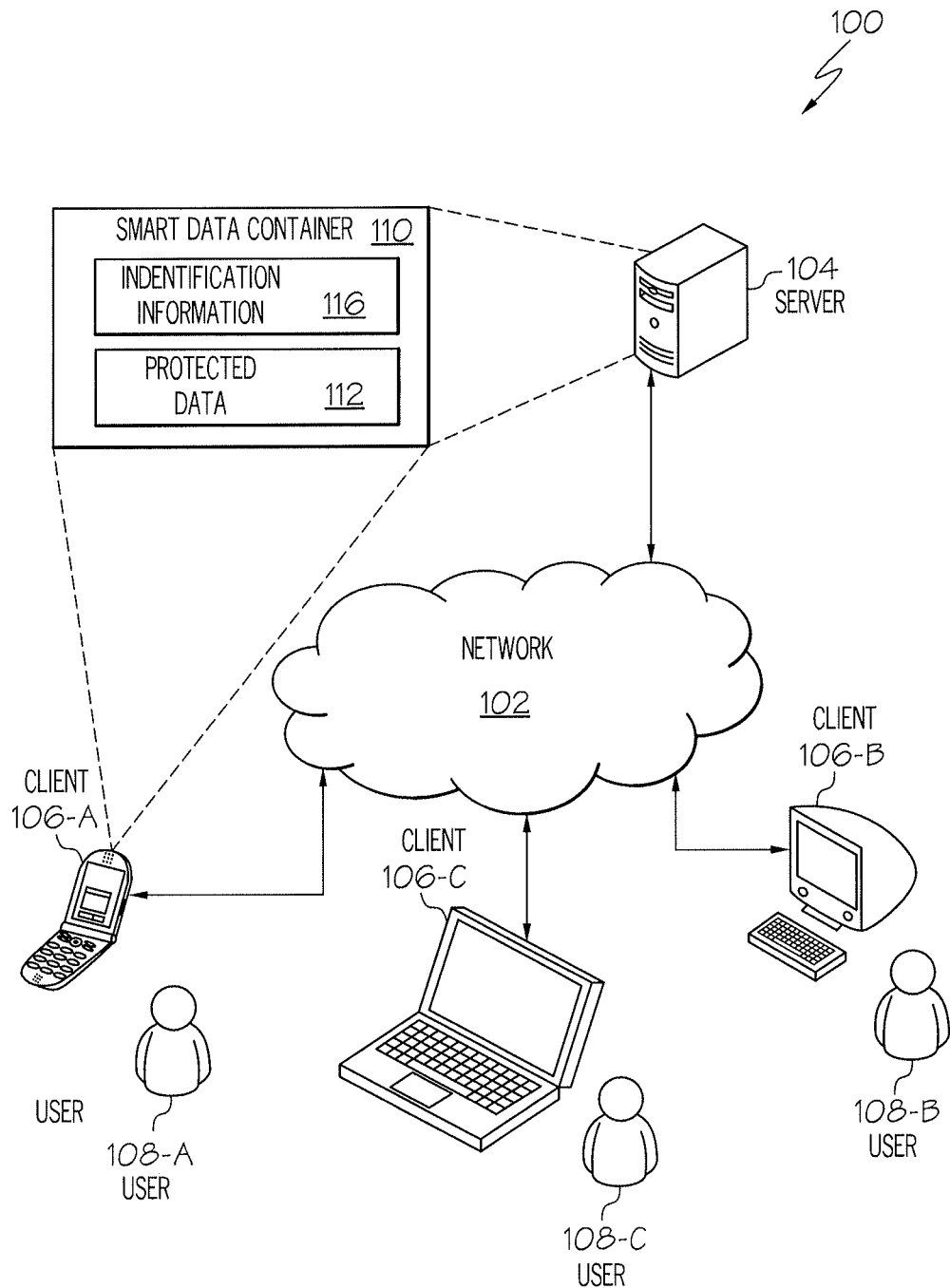
FIG. 1 illustrates an environment for creating and accessing a self-destructing smart data container for protected data according to a non-limiting embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor and/or processing circuitry of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular aspects only and is not intended to be limiting of the disclosure. As used herein, the singular forms "a," "an," and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Current data storage solutions have limited ability to prevent the accessing and copying of protected data stored on a computer system. More specifically, the technology that allows for the creation and storage of data makes it easy for unauthorized devices to access and copy such data. As a result, confidential and other protected data may be accessed by unauthorized parties and devices.

Accordingly, there is a need in the marketplace for a data storage solution with the ability to prevent access to protected data by unauthorized parties and devices. The present disclosure provides, inter alia, a solution to overcome the weaknesses of traditional data storage approaches. The present disclosure describes, inter alia, a more secure system for creating and storing protected data in a self-destructing smart file or other data container that cannot be copied by devices other than the device used to create the smart file or smart container. This unique solution may be extended to applications, databases, storage, etc. Embodiments of the present disclosure may address the above problems, and other problems, individually and collectively.

FIG. 1 illustrates an exemplary distributed system 100 in which the subject matter of the disclosure can function. The system 100 generally includes a network 102 communicatively coupling a server 104 to one or more client devices 106. Users 108 may be present on client devices 106 to generate smart data containers, generate data access requests, provide authorization and authentication information, and receive requested data upon proper authentication.

The network 102 generally refers to any interconnecting system capable of transmitting audio, video, signals, data, messages, or any combination of the preceding. Further, the network 102 may include all, or a portion of a public switched telephone network (PSTN), a public or private network, a local area network (LAN), a metropolitan area network (MAN), a wide area network (WAN), a local, regional, or global communication or computer network such as the Internet, a wired or wireless network, an enterprise intranet, other suitable communication link, or any combination of similar systems.

The server 104 may include, for example, a file server, a domain name server, a proxy server, a web server, a computer workstation, or any other device operable to dynamically adjust the access restrictions imposed on the requested data by the environment 100. Further, the server 104 may use any appropriate operating system, such as MSDOS®, MAC-OS®, WINDOWS®, UNIX®, or any other operating system currently in existence or developed in the future.

As used here, the term "client" and "client devices", as with client devices 106, generally refers to any suitable device operable to communicate with the server 104 through the network 102. Further, client devices 106 may employ any known operating systems such as MS-DOS®, PC-DOS®, OS-2®, MAC-OS®, or any other appropriate operating systems. Client devices 106 may include, for example, a personal digital assistant, a computer (e.g., a laptop, a desktop workstation, a server, etc.), a cellular phone, a mobile internet device (MID), an ultra-mobile PC (UMPC), or any other device operable to communicate with the server 104 through the network 102.

Security measures for generating smart data containers and preventing unauthorized access to protected data contained in the smart data containers 110 may be performed by system 100. According to certain embodiments, the smart data container 110 may be thought of as a small, lightweight virtual machine, that is powered up when a user accesses it. The smart data container 110 operates as a digital vault that identifies the machine on which it was created and the user who authorized its creation. As will be described in more detail below the smart data container 110 stores protected data 112 in an encrypted form within itself. Protected data 112 may include an confidential data or an application for which restricted access is desired. Access to protected data 112 may be denied to any device and user that did not create the smart data container 110.

For the creation of smart data container 110, a user 108-A may use a client device 106-A to provide data to server 104 and request the generation of a smart data container 110 for securely storing the protected data 112. As depicted in FIG. 1, client device 106-A may be located remotely from server 104. In certain embodiments, the server 104 may operate to create smart data container 110. In response to such requests, the protected data 112 may be stored in a smart data container 110 on server 104. In other embodiments, a client device 106-A may be used to locally create and store smart data container 110. Thus, it is generally recognized that a smart data container 110 may be created and stored on any computing device in system 100.

According to certain embodiments, the intelligence for determining whether a user 108 and client device 106 may be allowed to access protected data 112 is built into smart data container 110. Thus, according to certain embodiments, smart data container 110 may include capabilities for authenticating a requesting user 108 and authenticating a client device 106 from which access is requested. For example, according to certain embodiments that are described in more detail with regard to FIGS. 2-5, identification information 116 may be stored with protected data 112 in smart data container 110. When access to smart data container 110 is requested, the identification information 116 may be used to verify at least the identity of the client device 106 requesting access to protected data 112 in smart data container 110. Additionally, according to certain embodiments, the identity of the user 108 requesting access may also be verified. Access to protected data 112 may only be given to the client device 106-A and/or user 108-A that created smart data container 110. Client devices 106 other than the particular client device 106-A that requested the creation of smart container 110 will be denied access. Thus, if client device 106-A creates and stores protected data 112 in smart data container 110, client devices 106-B and 106-C may be denied access to such protected data 112.

According to certain embodiments, smart data container 110 may also be capable of data destruction where access to the smart data container 110 is denied. For example, if smart data container 110 is copied or moved to a client device 106 other than the client device on which or by which it was created, protected data 112 may be destroyed when access is attempted by the unauthorized device. For example, if smart data container 110 is created by and stored on client device 106-A, it may not be accessed by client device 106-B or 106-C. If client devices 106-B or 106C attempt to access smart data container 110, smart data container 110 may cause the data or itself to be destroyed.

In one example implementation, a user 108-A of client device 106-A may request creation of smart data container 110 for storing protected data 112 on client device 106-A or server 104. An example process for creating a smart data container 110 is described in more detail below with respect to FIGS. 3 and 5.

In various embodiments, client device 106-A or server 104 may operate to create smart data container 110. For example, according to certain embodiments, client device 106-A may generate a device identifier that is unique to client device 106-A and may be used at a later time to authenticate or otherwise validate client device 106-A when access to smart data container 110 is requested. According to certain other embodiments, server 104 may request and receive the device identifier from client device 106-A. The device identifier may then be stored in identification information 116 within smart data container 110. In certain embodiments, a user identifier may also be requested or otherwise obtained for authenticating and validating the identity of the user 108-A requesting the creation of data smart container 110.

In one particular embodiment, for example, the device identifier may include a distortion of a discontinuous wave form such as that as disclosed in U.S. Patent Application 2016/0044429 assigned to InAuth, Inc., which is incorporated herein in its entirety. The audio waveform may be unique to client device 106-A and, thus, may be used to uniquely identify client device 106-A. Accordingly, in certain embodiments, the device identifier stored in identification information 116 includes a sound generated in response to the playing of a source digitized audio file containing a discontinued waveform. As described above, the device identifier may be stored in the smart data container 110 with protected data 112.

According to certain embodiments, when any of client devices 106 request access to protected data 112 in smart data container 110, access may only be allowed if the particular client device 106 and/or user 108 requesting access is the client device 106 and/or user 108 that initially requested the creation of smart data container 110. Thus, if user 108-A uses client device 106-A to create smart data container 110, only user 108-A may access protected data 112 from client device 106-A.

In certain embodiments, smart data container 110 includes the functionality for authenticating or otherwise validating the identity of the user 108 requesting access to smart data container 110. For example, in certain embodiments, smart data container 110 may request a client identifier and/or a user identifier from the user 108 requesting access to smart data container 110. The request for the identifiers may be in response to an access request where the access request does not include the identifiers. Upon receiving the device identifier and/or a user identifier from the source of the access request, the identifiers may be compared against identification information 116 stored in smart data container 110. Where the client device identifier and the user identifier match the data stored in identification information 116 within smart data container 110, access to protected data 116 may be allowed. Conversely, where the identifiers do not match the identification information 116 stored in smart data container 110, server 104 may deny access to protected data 112.

According to certain embodiments, once access is allowed, smart data container 110 may only expose a small set of operations that can be performed on protected data 112. For example, in particular embodiments, the interface may expose operations for reading, updating, writing, or performing other appropriate operations on protected data 112.

Conversely, when access to protected data 112 is denied, protected data 112 and/or smart data container 110 may be modified to prevent any further access to protected data 112, according to certain embodiments. For example, protected data 112 and/or smart data container 110 may be destroyed. In other embodiments, protected data 112 may be corrupted. In still other embodiments, an encryption key associated with protected data 112 may be destroyed.

FIG. 1 is just one example environment in which smart data containers may be created and accessed. For example, though a distributed client-server system is depicted in FIG. 1, it is recognized and described above the creation and storage of the smart data container 110 may be performed locally on a client device 106. As another example, it may be understood that the above-described audio waveform is only example of a device identifier that may be used to create and then authenticate a client device 106. Any suitable type of device identifier may be used.

Figure 2:
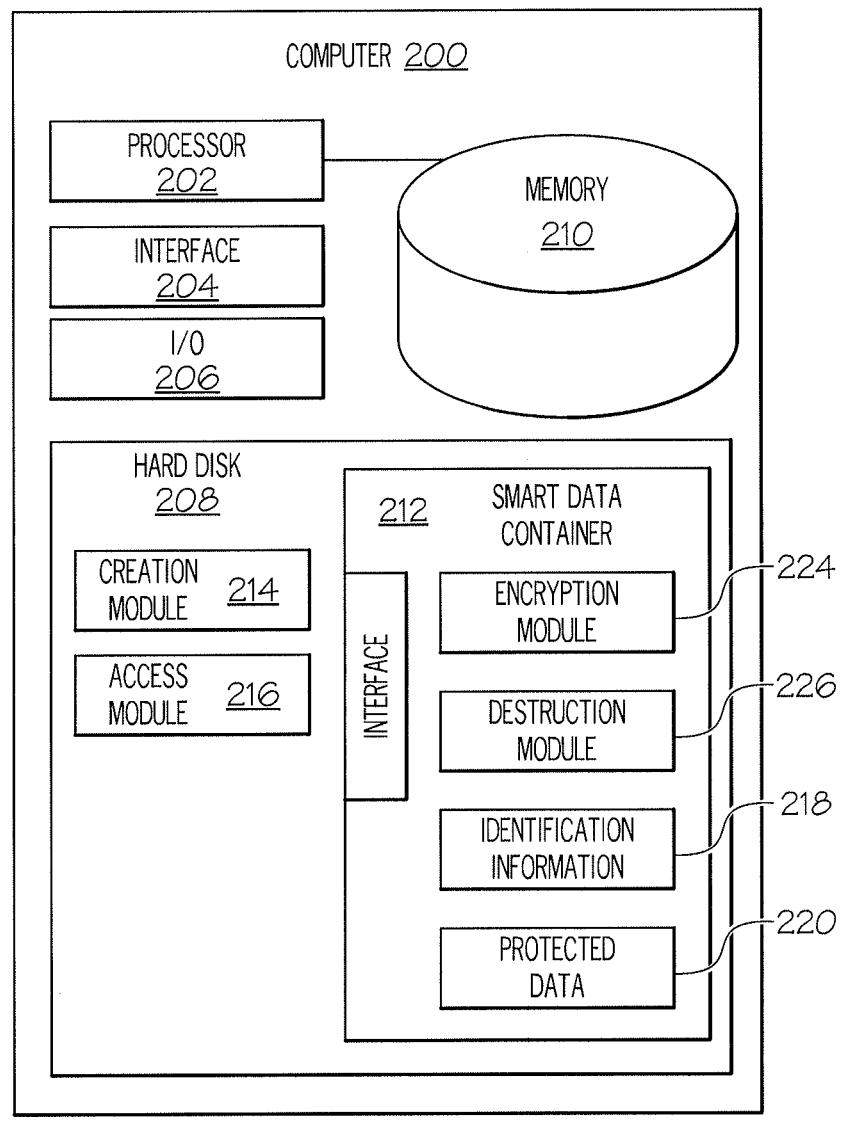
FIG. 2 illustrates computer system for creating and accessing a self-destructing smart data container for protected data, according to a non-limiting embodiment of the present disclosure.

FIG. 2 illustrates a computer system 200 for creating and accessing a self-destructing smart data container to protect data according to a non-limiting embodiment. In particular embodiments, the computing device 200 can be the client device 106-A, 106-B, or client device 106-C. In other embodiments, computing device 200 can be server 104.

As depicted, computer system 200 includes a processor 202, a network interface 204, an input/output 206, a hard disk 208, and a system memory 210. The network interface 204 connects the computer system 200 to the network 102 for creating and accessing smart data containers made by computer system 200. The processor 204 may be utilized for processing requirements of the computer system 200. In certain embodiments, processor 204 may be operable to load instructions from hard disk 208 into memory 210 and execute those instructions. I/O device 206 may receive data from a server or network.

Network interface 204 may refer to any suitable device capable of receiving an input, sending an output from the computer system 200, performing suitable processing of the input or output or both, communicating with other devices, and so on. For example, the network interface 204 may include appropriate modem hardware, network interface card, and similar devices. Further, the software capabilities of the network interface 204 may include protocol conversion and data processing capabilities, to communicate through a LAN, WAN, or other communication system, allowing the server 104 to communicate to other devices. Moreover, the network interface 202 may include one or more ports, conversion software, or both.

Processor 202 can be any suitable device capable of executing instructions and manipulating data to perform operations for the computer system 200. Processor 202 may include microprocessors, microcomputers, microcontrollers, digital signal processors, central processing units, processing circuitry, state machines, logic circuitries, and/or any devices that manipulate signals based on operational instructions. For example, processor 202 may be any central processing unit (CPU), such as the Pentium processor, the Intel Centrino processor, and so on.

Further, the system memory 210 may be any suitable device capable of storing computer-readable data and instructions. For example, the system memory 210 may include logic in the form of software applications, random access memory (RAM) or read only memory (ROM). Further examples may include mass storage medium (e.g., a magnetic drive, a disk drive, or optical disk), removable storage medium (e.g., a Compact Disk (CD), a Digital Video Disk (DVD), or flash memory), a database and/or network storage (e.g., a server), other computer-readable medium, or a combination of any of the preceding.

In certain embodiments, hard disk 208 includes smart data container 212, a creation module 214, and an access module 216. Creation module 214 may include processing circuitry, instructions, or other functionality for creating smart data container 214. Access module 216 may include processing circuitry, instructions, or other functionality for accessing to smart data container 214.

In certain embodiments, creation module 214 receives and processes all smart data container creation requests. For example, creation module 214 may receive protected data 220 that user 108-A of client device 106-A desires to store in smart data container 212. In response to the request, creation module 214 may request identifiers which may be used to uniquely identify client device 106-A and user 108-A as the creator of smart data container 214. For example, in a particular embodiment, a client identifier may include an audio waveform that uniquely identifies client device 106-A. A user identifier may include an identifier that uniquely identifies user 108-A of client device 106-A.

Upon receiving the identifiers associated with the source of the creation request, creation module 214 may create smart data container 212. As depicted, smart data container 212 includes identification information 218 and protected data 220. An encryption module 224 may encrypt protected data 220 stored in smart data container 212. In a particular embodiment, identification information 218 may include a client identifier which uniquely identifies the client device 106-A that created smart data container 212 and/or a user identifier that uniquely identifies the user that requested creation of smart data container 212. In particular embodiments, the client identifier associated with client device 106-A may include an audio waveform such as that described above with regard to FIG. 1. It is recognized, however, that any suitable identification information may be used for authenticating the identity of the client device which created smart data container 214.

After creation of smart data container 212, access module 218 receives and processes all smart data container access requests. An access request may include a read request, an update request, a write request, a delete request, or any combination of these or other suitable and authorized operations on protected data 220.

In certain embodiments, access module 218 may operate to limit access to protected data 220 to only the client device 106 and/or the user 108 that created smart data container 212. In certain embodiments, access module 216 may receive a request to access protected data 220 that includes identifiers associated with the client device 106 and/or user 108. As described above, the identifiers may include a client device identifier that uniquely identifies the client device 106 and/or a user identifier that uniquely identifies the user 108 requesting access to protected data 220 in smart data container 212. Where the request does not include identification information, access module 216 may request a device identifier and/or user identifier from the client device 106 in response to the access request.

In certain embodiments, access module 216 processes the access request by comparing the device identifier and/or user identifier received from the requesting device to identification information 218 stored in smart data container 212. In particular embodiments, for example, access module 216 may use interface 222 to expose the device identifier of the client device 106-A and/or a user identifier stored in identification information 218. Access module 216 may then compare the identifiers received from the requesting client device 106 to the identifiers of the client device and user that created smart data container. If the device identifier from the requesting client device 106 matches the device identifier for the client device 106-A that created smart data container 214, access module 216 may determine that the requesting client device 106 is the same as client device 106-A that created smart data container 212. Likewise, if the user identifier associated with the request matches the user identifier for the user 108-A that created smart data container 212, access module 216 may determine that the requesting user 108 is the same user 108-A that created smart data container 212. Access module 216 may then allow client device 106-A to perform the read, update, write, delete, or other requested operation on protected data 222.

Conversely, if the device identifier or the user identifier associated with the request to access protected data 220 does not match the device identifier and/or user identifier stored in identification information 218 that uniquely identifies client device 106-A and user 108-A that created smart data container 212, access module 216 denies access to the requesting client device 106.

In certain embodiments, smart data container 212 includes a destruction module 226. Destruction module 226 may modify smart data container 212 and/or protected data 220 in smart data container 212 in response to a denied access attempt. For example, in a particular embodiment, destruction module 226 may destroy an encryption key generated by encryption module 224 when protected data 220 was stored in smart data container 212. In another embodiment, destruction module 226 may destroy smart data container 212 and protected data 220 stored therein.

It may also be noted that the computer system 200 is depicted as including only a single network interface 204, processor 202, input/output 206, hard disk 208, and memory 210; in other embodiments, these items may be present in multiple items, or combined items, as known in the art. Additionally, smart data container 212, creation module 214, and access module 216 are depicted as being included in hard disk 208. It is recognized that other embodiments may include the placement of one or more of these components elsewhere in computer system 200. Further, though hard disk 208 is depicted as storing only a single smart data container 212, it is recognized that computer system 200 may include multiple smart data containers 212.

Figure 3:
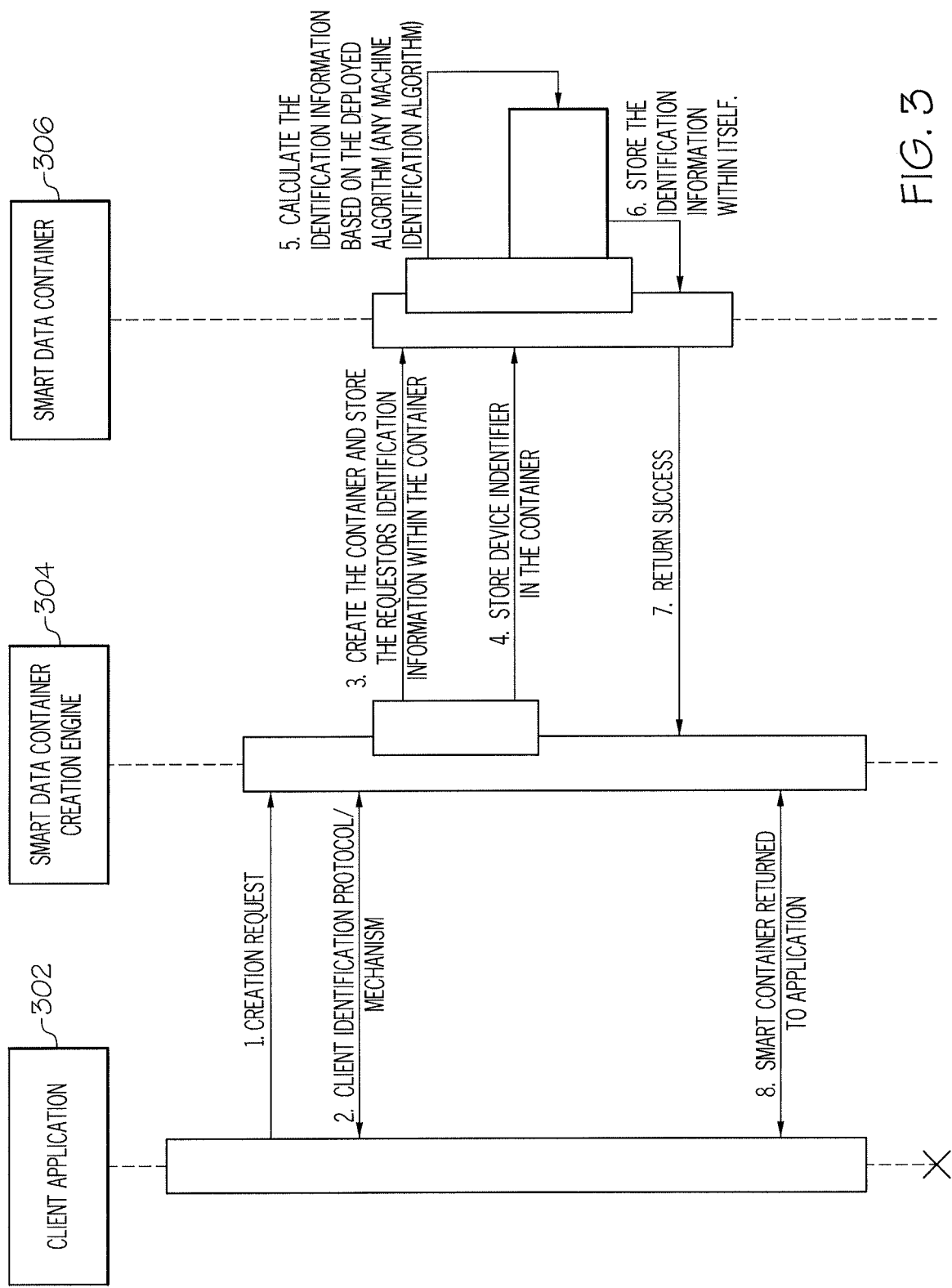
FIG. 3 illustrates a sequence diagram for creating a self-destructing smart data container for protected data, according to a non-limiting embodiment of the present disclosure.

FIG. 3 illustrates a sequence diagram for generating a self-destructing smart data container, according to a non-limiting embodiment of the present disclosure. The sequence depicts the interaction of a client application 302 of a client device 106, a smart data container creation engine 304, and smart data container 306. As shown, client application 302 sends a creation request to smart container creation engine 304. Smart container creation engine 304, which may include creation module 214 discussed above with regard to FIG. 2, uses a client identification protocol or mechanism to interact with client application 302 for the purpose of identifying the requestor. In a particular embodiment, the client identification protocol may include receiving or otherwise obtaining a device identifier and/or a user identifier from client application 302. For example, an audio waveform which uniquely identifies a client device may be obtained and used to uniquely identify client application 302 and/or client device 106. As another example, a user identifier may be obtained to uniquely identify user 108 that requests creation of smart data container 306. Smart container creation engine 304 may then create smart data container 306. As described above, the device identifier and/or the user identifier may be stored in smart data container 306 with the protected data.

In certain embodiments, smart data container creation engine 304 and/or smart data container 306 may calculate identification information based on a deployed algorithm. As described above, algorithms such as those describe in U.S. Patent Publication No. 2016/00244429 may be used in certain embodiments for calculating the identification information and such identification information may be stored within smart data container 306 itself. It is recognized, however, that any suitable machine identification algorithm may be used for uniquely identifying the client device 306 requesting creation of smart data container 306.

Upon creation of smart data container 306, a return success message may be transmitted to smart data container creation engine 304 and/or client application 302 which requested creation of smart data container 306.

Figure 4:
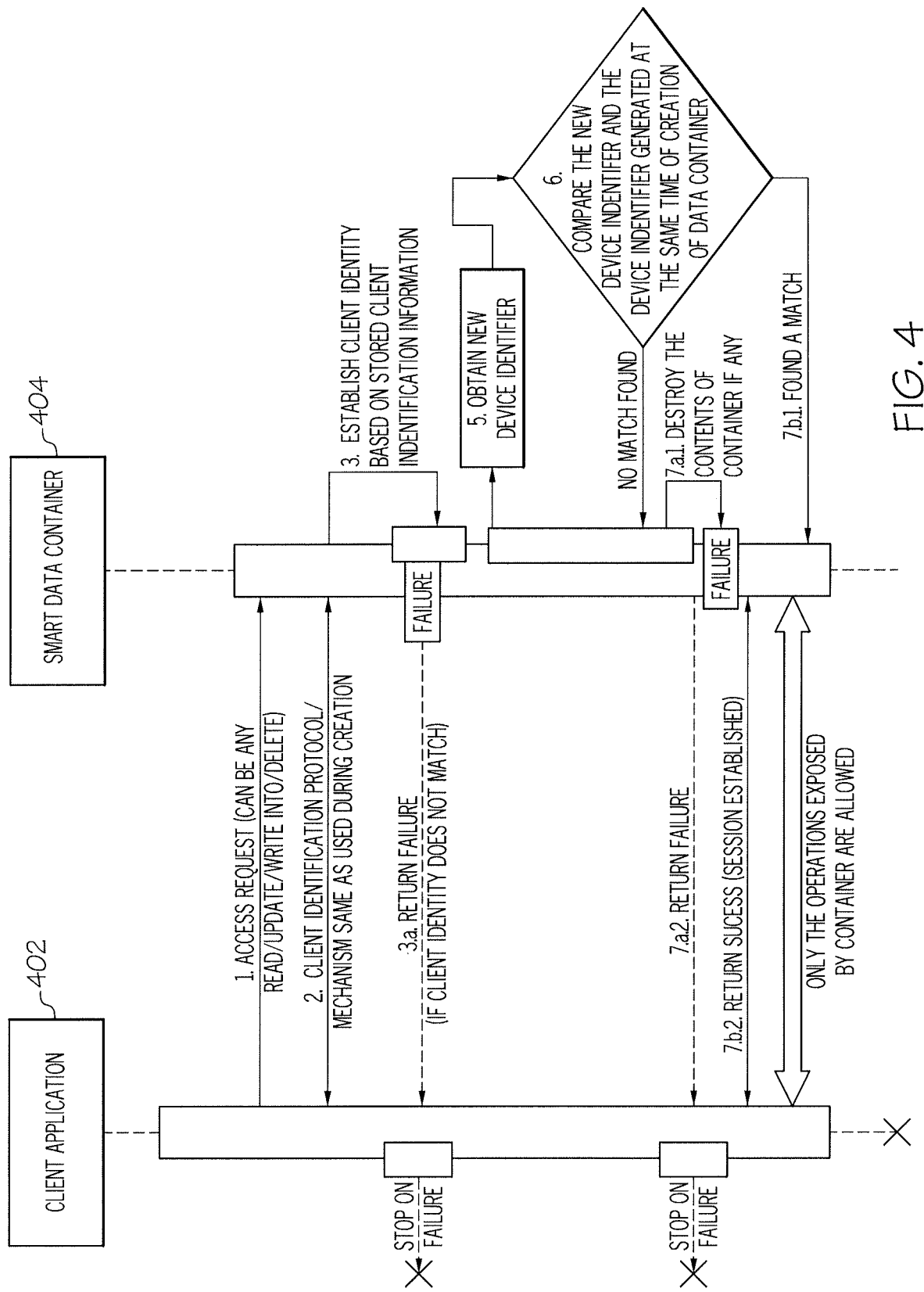
FIG. 4 illustrates a sequence diagram for accessing a self-destructing smart data container for protected data, according to a non-limiting embodiment of the present disclosure.

FIG. 4 illustrates a sequence diagram for accessing a self-destructing smart data container, according to a non-limiting embodiment of the present disclosure. The sequence depicts the interaction of a client application 402 of a client device 106 and smart data container 404. As shown, client application 402 sends an access request to smart data container 404. The access request may include a read request, a write request, an update request, a delete request, or any other suitable request for accessing or modifying protected data stored in smart data container 404.

A client identification protocol or mechanism is used to identify client application 402. In certain embodiments, the client identification protocol or mechanism is the same as was used to identify client application 302 which requested the creation of smart data container 404. For example, the client identity and/or user identity may be established by comparing identifiers received with the access request to identification information stored in smart data container 404.

For example, a device identifier and/or user identifier may be obtained from the client application 402 requesting access to smart data container 404. For example, a new audio waveform may be obtained from client application 402. Additionally, an audio waveform associated with the creator of smart data container 404 may be obtained from within smart data container 404. The two audio waveforms may be compared. Thus, the new device identifier may be compared to the device identifier generated at the time of creation of smart data container 404. Likewise, a user identifier may be obtained from the user requesting access to smart data container 402. This user identifier may be compared to a user identifier associated with the user that created smart data container 404.

If the device and/or user identifiers are determined not to match, smart container 404 or the contents thereof may be destroyed and a return failure may be returned to client application 402. Conversely, if the device and/or user identifiers match, a return success may be returned to client application 402. Prior to the match in device identifiers and user identifiers being established, no other operations may be exposed by container. Stated differently, the only operations that may be exposed by the smart data container 404 may be the identification matching of client identifiers for verifying the authenticity of the requesting client application 402 as the creator of smart data container 404.

Figure 5:
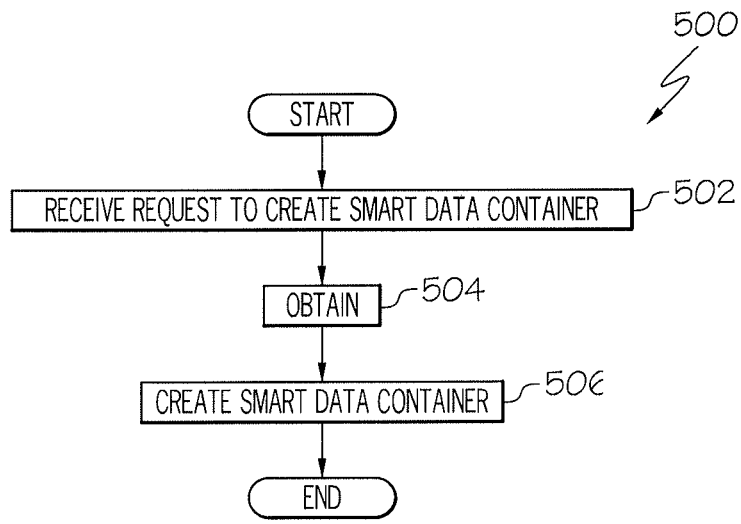
FIG. 5 illustrates a flow diagram depicting a process for creating a self-destructing smart data container, according to a non-limiting embodiment of the present disclosure.

FIG. 5 illustrates flow diagram depicting a process for creating a self-destructing smart data container, according to a non-limiting embodiment of the present disclosure. As depicted, the method begins at step 502 when a request to create a smart data container 110 is received. At step 504, at least one unique identifier is generated or obtained. In certain embodiments, for example, a first device identifier may be generated for the client device 106-A that requests creation of the smart data container. In other embodiments, the first device identifier may be requested and obtained from the client device 106A that is requesting creation of the smart data container. In a particular embodiment, for example, the first device identifier may include an audio waveform that uniquely identifies client device 106-A. In certain embodiments, a first user identifier may also be generated by or obtained from the user of client device 106A. When the smart data container is accessed later, the first device identifier and the first user identifier may be used to verify the identities of the user and device requesting access to the smart data container.

At step 506, the smart data container 110 is created. In certain embodiments, the protected data, the first device identifier, and the first user identifier are stored within the smart data container. At least the protected data may be stored in an encrypted format.

Figure 6:
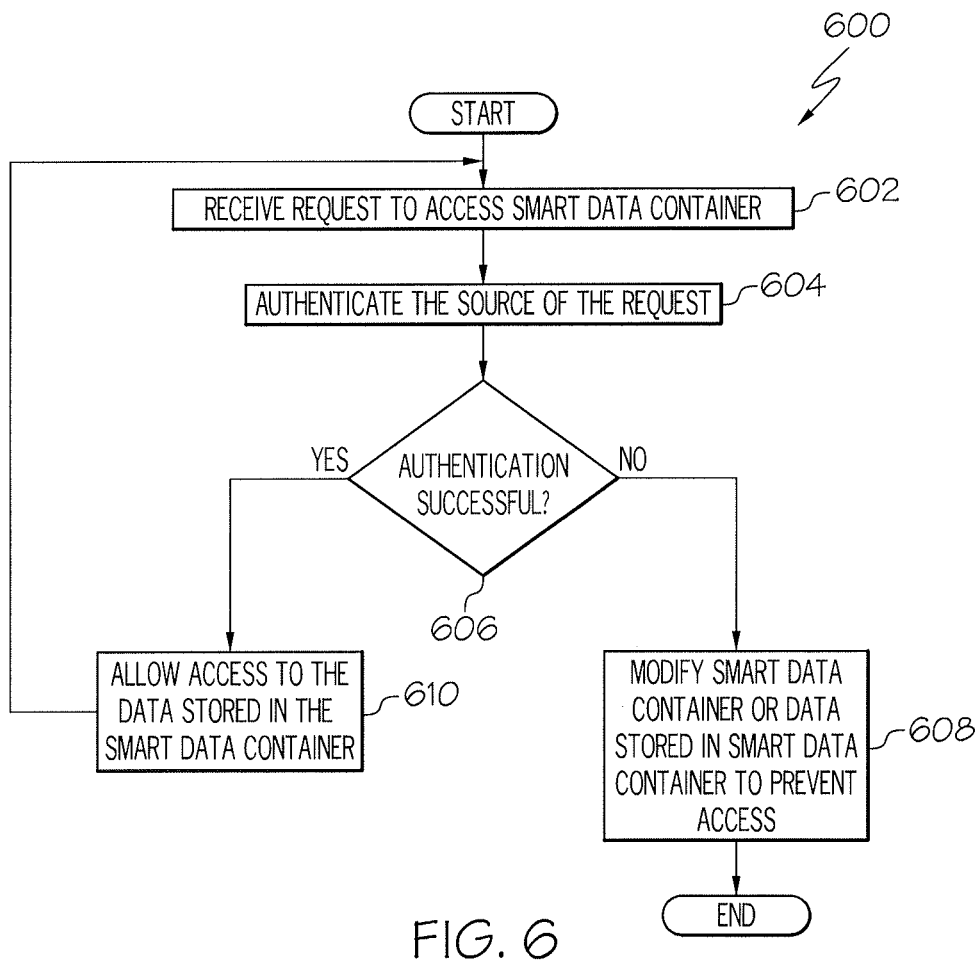
FIG. 6 illustrates a flow diagram depicting a process for accessing a self-destructing smart data container, according to a non-limiting embodiment of the present disclosure.

FIG. 6 illustrates flow diagram depicting a process for accessing a self-destructing smart data container, according to a non-limiting embodiment of the present disclosure. As depicted the method begins at step 602 when a request to access the smart data container is received.

At step 604, the source of the request to access the smart data container is authenticated or otherwise validated. In certain embodiments, authenticating the source of the request includes authenticating the client device requesting access to the smart data container. Specifically, a device identifier associated with the request may be compared to the device identifier associated with the device that was used to create the smart data container.

For example, in certain embodiments, the request to access the smart data container may include a second device identifier that is associated with the particular client device 106 seeking access to the smart data container. The client device may be authenticated by comparing the first device identifier stored in the smart data container to the second device identifier included in the request to access the smart data container.

In certain embodiments, authenticating the source of the request may additionally include authenticating the user requesting access to the smart data container. Specifically, a user identifier associated with the request may be compared to the user identifier associated with the user who initially created the smart data container.

For example, in certain embodiments, the request to access the smart data container may include a second user identifier that is associated with the user 108 seeking access to the smart data container. The user may be authenticated by comparing the first user identifier stored in the smart data container to the second user identifier included in the request to access the smart data container.

In certain embodiments, the request may not include the second device identifier and/or the second user identifier. In such a scenario, one or both of the identifiers may be requested from client device 106 and user 108 after receiving the request to access the smart data container. Thus, an authentication handshake procedure may be performed in response to the request to access the smart data container, wherein the identifiers are obtained directly from the client device and user seeking access to the smart data container. After the identifiers are obtained, the client device may be authenticated by comparing the first device identifier stored in the smart data container to the requested and obtained second device identifier. Likewise, the user may be authenticated by comparing the first user identifier stored in the smart data container to the second user identifier requested and obtained from the user seeking access to the smart data container.

At step 606, a determination is made as to whether the source of the request was successfully authenticated at step 604. In certain embodiments, for example, if one or both of the client device and the user seeking access to the smart data container are not authenticated or otherwise validated, the method continues to step 608. Specifically, the smart data container and/or the data stored in the smart data container is modified to prevent any protected data within smart data container from being accessed at step 608. In a particular embodiment, for example, an encryption key associated with the protected data stored in the smart data container is destroyed. In another particular embodiment, the smart data container or the protected data stored within may be destroyed.

Conversely, if the source of the request seeking access to the smart data container is authenticated or otherwise validated at step 606, the process continues to step 610 and access to the protected data stored in the smart data container is allowed. In particular embodiments, the user of the requesting client device may be allowed to perform a read, write, update, delete, or other operation on the protected data stored in smart data container. The method may then return to step 602 when a further request to access the smart data container is received.

The figures illustrate the architecture, functionality, and operation of possible implementations of systems, methods, and computer program products according to various aspects of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

While the present disclosure has been described in connection with preferred embodiments, it will be understood by those of ordinary skill in the art that other variations and modifications of the preferred embodiments described above may be made without departing from the scope of the invention. Other embodiments will be apparent to those of ordinary skill in the art from a consideration of the specification or practice of the invention disclosed herein. It will also be understood by those of ordinary skill in the art that the scope of the disclosure is not limited to use in a server diagnostic context, but rather that embodiments of the invention may be used in any transaction having a need to monitor information of any type. The specification and the described examples are considered as exemplary only, with the true scope and spirit of the invention indicated by the following claims.

What is claimed is:

1. A method, comprising:
   storing protected data in an encrypted format in a smart data container, the smart data container comprising a virtual machine running on a computing device, the virtual machine operating as a digital vault storing the protected data and a first identifier associated with a first device that created the smart data container, the virtual machine comprising functionality for performing authentication of the first device before allowing access to the protected data;
   receiving a request to access protected data stored in a smart data container, the request comprising a second identifier associated with a second device from which the request to access the protected data is received;
   using the functionality of the virtual machine to compare the second device identifier associated with the second device from which the request to access the protected data stored in the smart data container was received to the first device identifier which uniquely identifies the first device that created the smart data container; and
   using the functionality of the virtual machine to perform one of:
      determine that the second identifier does not match the first identifier; and
      modify the smart data container to prevent access to the protected data stored in the smart data container by the second device in response to determining that the second device identifier does not match the first device identifier, wherein modifying the smart data container to prevent access to the protected data comprises destroying an encryption key associated with the protected data stored in the smart data container.

2. The method of claim 1, wherein the smart data container comprises an interface that exposes at least one operation that may be performed on the protected data after access to the protected data is allowed.

3. The method of claim 2, wherein the at least one operation is selected from the group consisting of a read request, an update request, a write request, and a delete request.

4. The method of claim 1, wherein comparing the first device identifier to the second device identifier comprises comparing a first audio waveform created with the creation of the smart data container and being associated with the first device to a second audio waveform associated with the second device.

5. The method of claim 1, wherein modifying the smart data container to prevent access to the protected data comprises destroying the smart data container and the protected data stored in the smart data container.

6. The method of claim 1, wherein prior to storing the protected data in a smart data container and receiving the request to access the protected data stored in the smart data container the method comprises:
   receiving, from the first device, a request to create the smart data container;
   using a client identification protocol to generate the first device identifier which uniquely identifies the first device from which the request to create the smart data container was received.

7. The method of claim 1, wherein the request to access the protected data is received from a client application and the method further comprises:
   authenticating the identity of the client application prior to comparing the first device identifier to the second device identifier.

8. The method of claim 1, wherein the computing device on which the virtual machine is running and on which the smart data container is stored is different than the first device.

9. A computer comprising:
   a processor; and
   a non-transitory, computer-readable storage medium storing instructions that when executed by the processor cause the processor to:
      store protected data in an encrypted format in a smart data container, the smart data container comprising a virtual machine running on a computing device, the virtual machine operating as a digital vault storing the protected data and a first identifier associated with a first device that created the smart data container, the virtual machine comprising functionality for performing authentication of the first device before allowing access to the protected data;
      receive a first request to access protected data stored in a smart data container, the request comprising a second identifier associated with a second device from which the request to access the protected data is received;
      using the functionality of the virtual machine to compare the second device identifier associated with the second device from which the first request to access the protected data stored in the smart data container was received to the first device identifier which uniquely identifies the second device that created the smart data container;
      using the functionality of the virtual machine to determine that the second identifier associated with the second device from which the first request was received does not match the first identifier which uniquely identifies the first device that created the smart data container; and
      using the functionality of the virtual machine to modify the smart data container to prevent access to the protected data stored in the smart data container by the second device in response to determining that the second device identifier does not match the first device identifier, wherein modifying the smart data container to prevent access to the protected data comprises destroying an encryption key associated with the protected data stored in the smart data container.

10. The computer of claim 9, wherein the smart data container comprises an interface that exposes at least one operation that may be performed on the protected data after access to the protected data is allowed.

11. The method of claim 10, wherein the at least one operation is selected from the group consisting of a read request, an update request, a write request, and a delete request.

12. The computer of claim 9, wherein comparing the first device identifier to the second device identifier comprises comparing a first audio waveform created with the creation of the smart data container and being associated with the first device to a second audio waveform associated with the second device.

13. The computer of claim 9, wherein modifying the smart data container to prevent access to the protected data comprises destroying the smart data container or the protected data stored in the smart data container.

14. The computer of claim 9, wherein the instructions are further executed by the processor to cause the processor to:
   receive from the first device, a request to create the smart data container, the request received prior to receiving the first request to access the protected data stored in the smart data container;
   use a client identification protocol to generate the first device identifier which uniquely identifies the first device from which the request to create the smart data container was received; and
   store the first device identifier and the protected data within the smart data container.

15. The computer of claim 9, wherein the first request to access the protected data is received from a client application and the instructions are further executed by the processor to cause the processor to:
   authenticating the identity of the client application prior to comparing the first device identifier to the second device identifier.

16. A non-transitory, computer-readable storage medium having instructions stored thereon that are executable by a computing system to:
   store protected data in an encrypted format in a smart data container, the smart data container comprising a virtual machine running on a computing device, the virtual machine operating as a digital vault storing the protected data and a first identifier associated with a first device that created the smart data container, the virtual machine comprising functionality for performing authentication of the first device before allowing access to the protected data;
   receive a request to access protected data stored in a smart data container, the request comprising a second identifier associated with a second device from which the request to access the protected data is received;
   using the functionality of the virtual machine to compare the second device identifier associated with the second device from which the request to access the protected data stored in the smart data container was received to the first device idenifier which uniquely identifies the first device that created the smart data container;
   using the functionality of the virtual machine to determine that the second identifier associated with the second device from which the first request was received does not match the first identifier which uniquely identifies the first device that created the smart data container; and
   using the functionality of the virtual machine to modify the smart data container to prevent access to the protected data stored in the smart data container by the second device in response to determining that the second device identifier does not match the first device identifier, wherein modifying the smart data container to prevent access to the protected data comprises destroying an encryption key associated with the protected data stored in the smart data container.

\* \* \* \* \*